Figure 1:
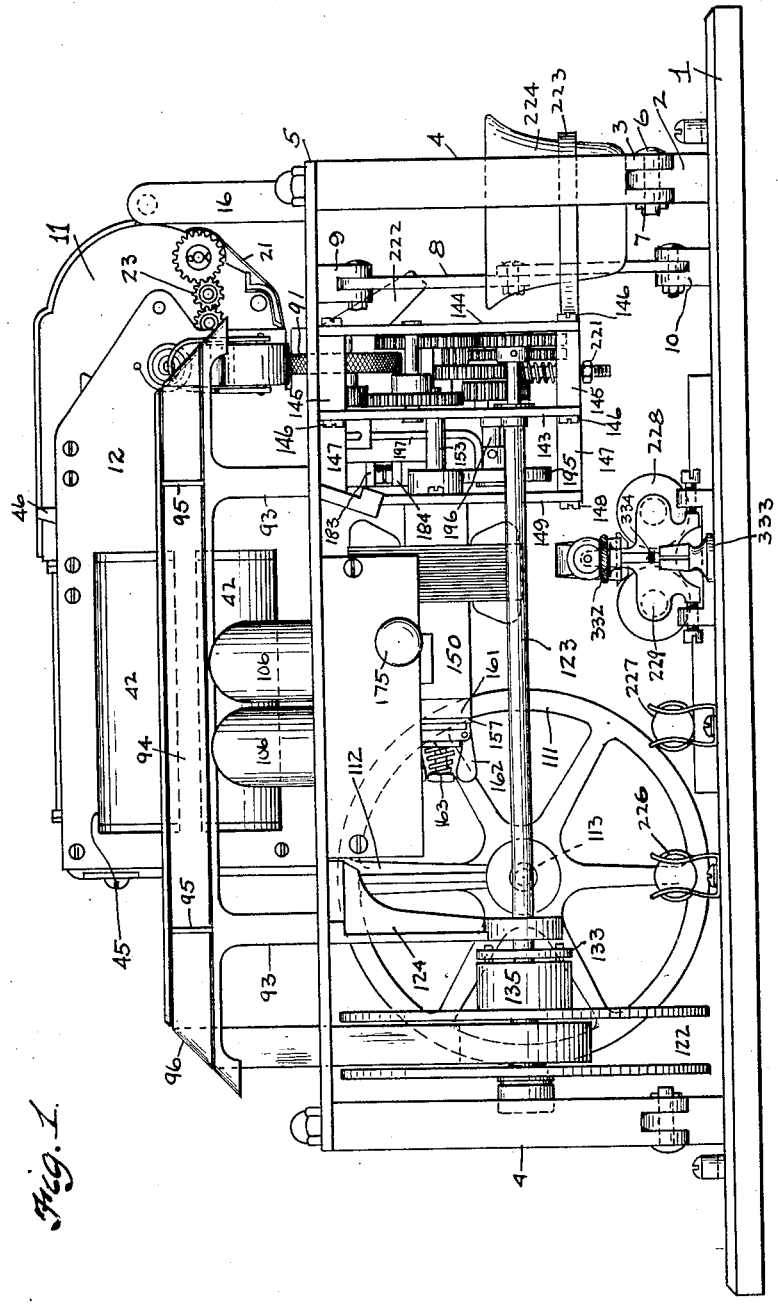

Nov. 3, 1931.  B. H. SMITH  1,830,569
RECORDER
Filed April 2, 1925   11 Sheets-Sheet 1

INVENTOR.
Boyd H. Smith
BY
Fay, Oberlin & Fay
ATTORNEYS

Nov. 3, 1931.  B. H. SMITH  1,830,569
RECORDER
Filed April 2, 1925   11 Sheets-Sheet 2

INVENTOR.
Boyd H. Smith
BY
Fay, Oberlin & Fay
ATTORNEYS

Nov. 3, 1931.　　　B. H. SMITH　　　1,830,569
RECORDER
Filed April 2, 1925　　　11 Sheets-Sheet 4

INVENTOR.
Boyd H. Smith.
BY
Fay, Oberlin & Fay
ATTORNEYS

Nov. 3, 1931.  B. H. SMITH  1,830,569
RECORDER
Filed April 2, 1925   11 Sheets-Sheet 5

INVENTOR.
Boyd H. Smith
BY
Fay, Oberlin & Fay
ATTORNEY.S

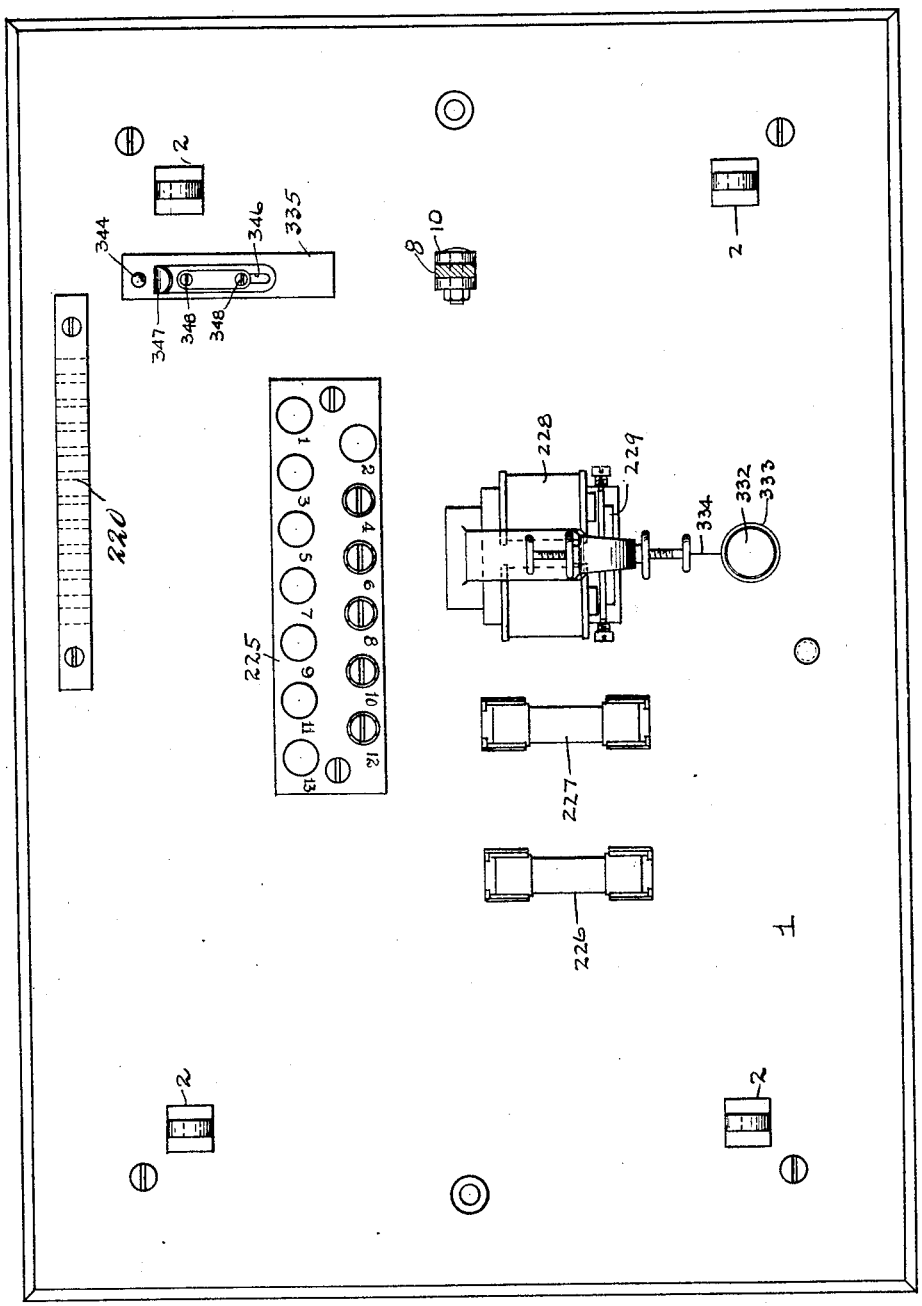

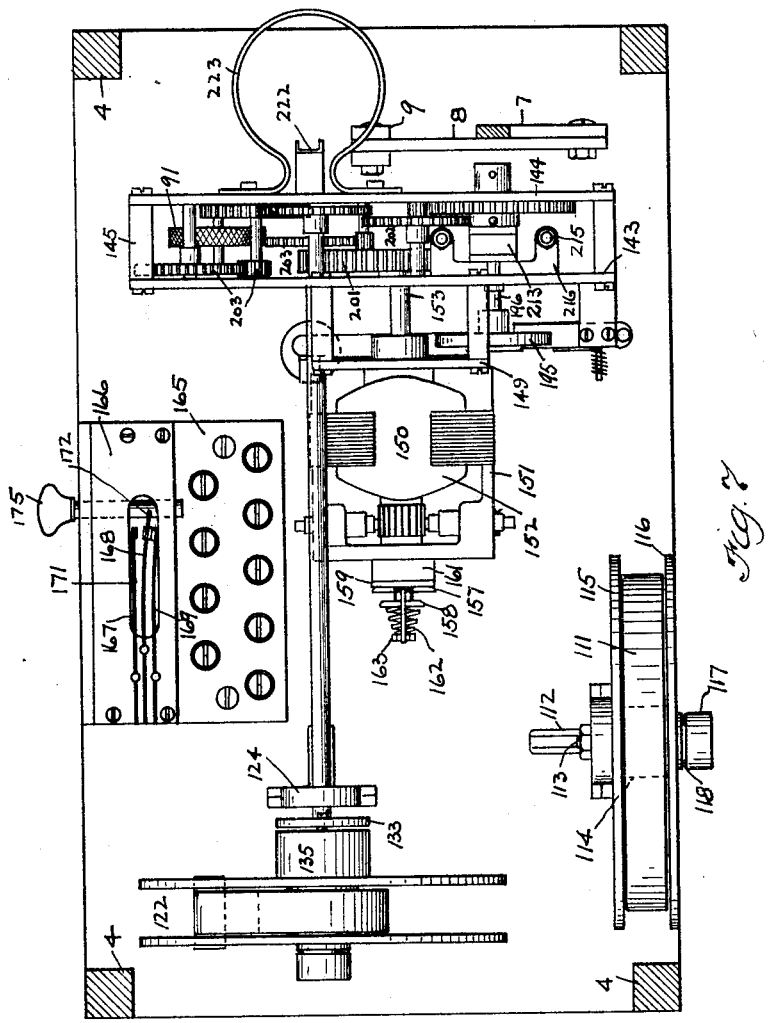

Nov. 3, 1931.  B. H. SMITH  1,830,569
RECORDER
Filed April 2, 1925   11 Sheets-Sheet 8
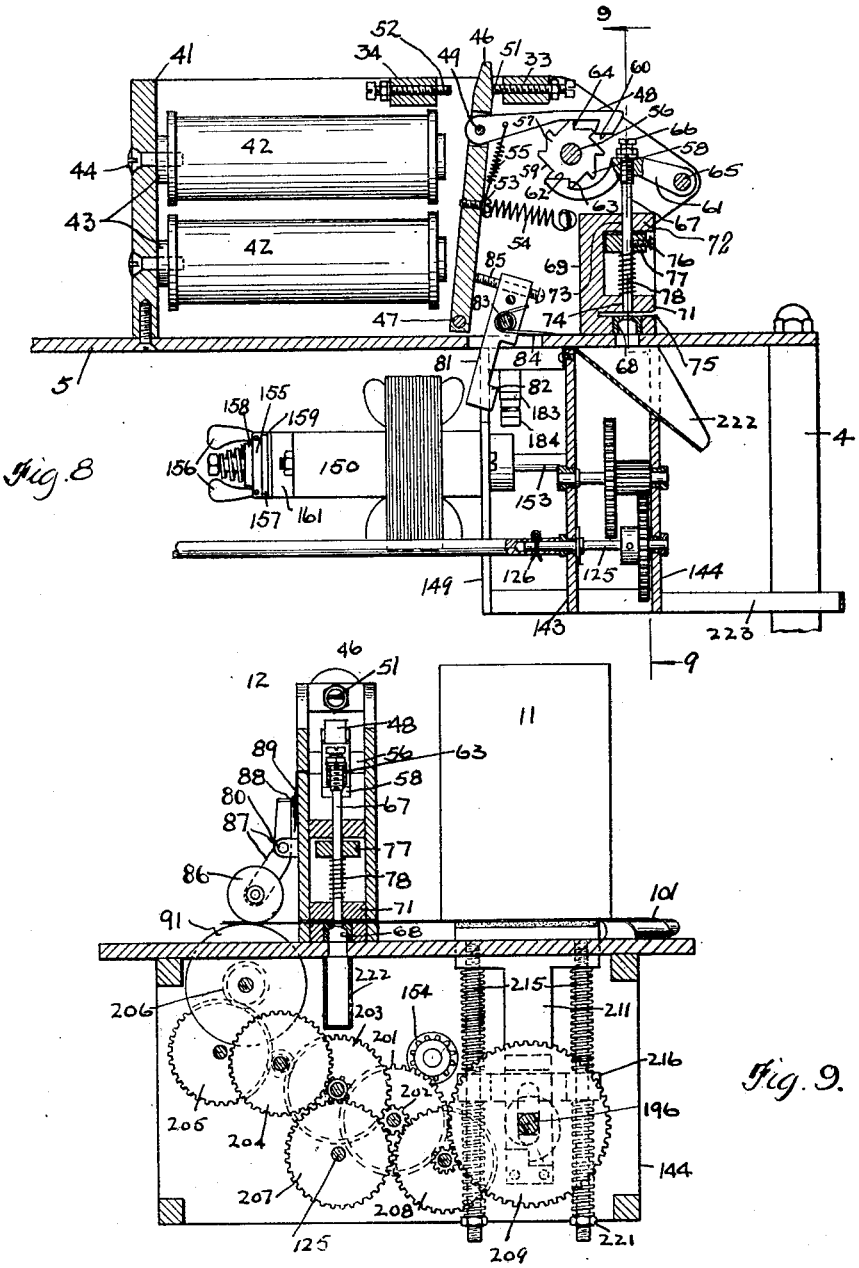

Nov. 3, 1931.  B. H. SMITH  1,830,569
RECORDER
Filed April 2, 1925   11 Sheets-Sheet 9
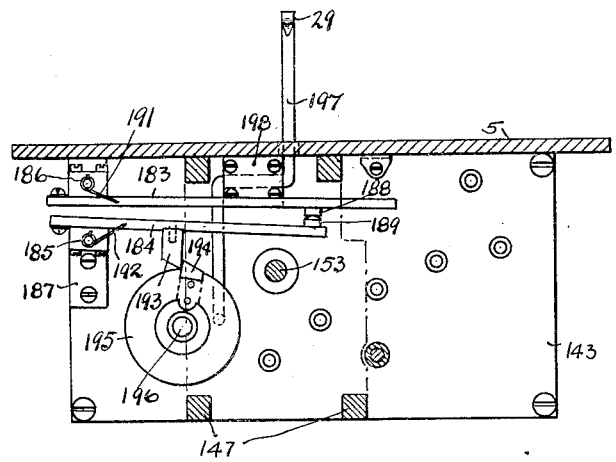
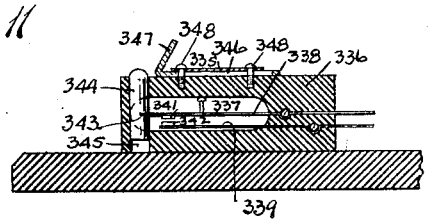
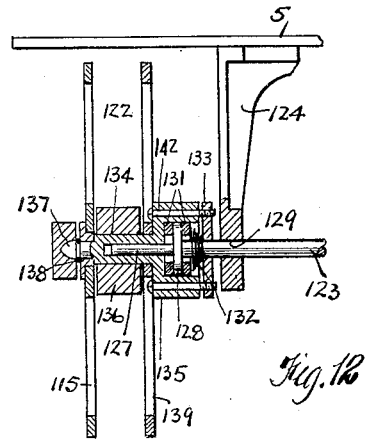
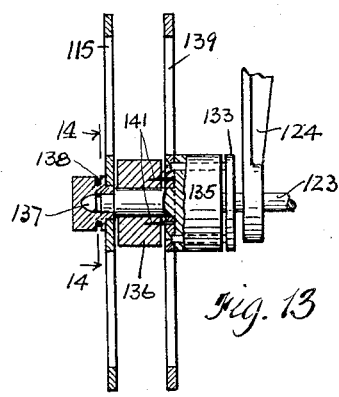
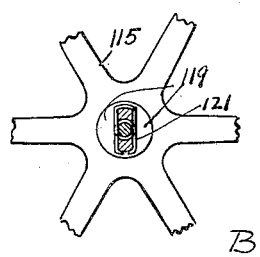
INVENTOR.
Boyd H. Smith
BY
Pay, Oberlin & Pay
ATTORNEYS Nov. 3, 1931.  B. H. SMITH  1,830,569
RECORDER
Filed April 2, 1925   11 Sheets-Sheet 10
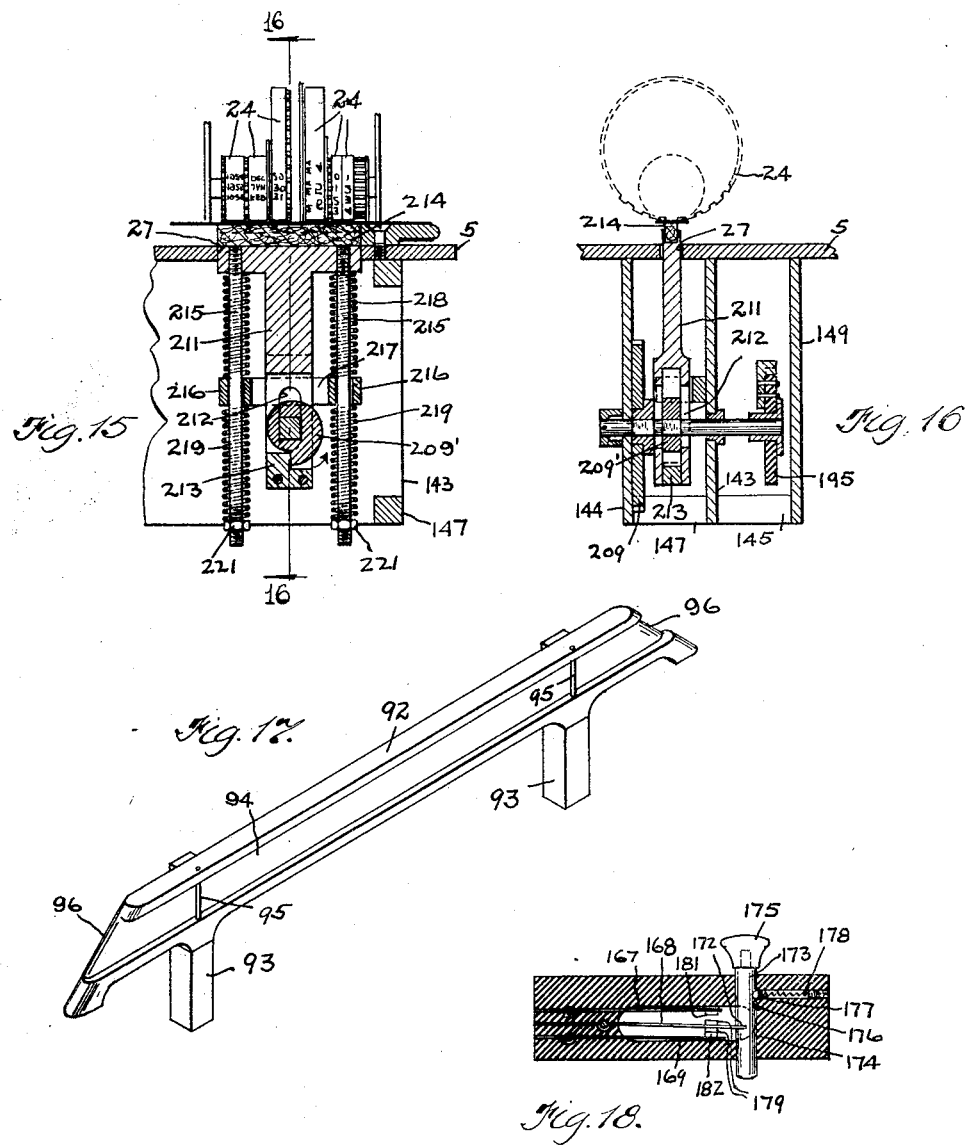

Nov. 3, 1931.　　　　B. H. SMITH　　　　1,830,569
RECORDER
Filed April 2, 1925　　　11 Sheets-Sheet 11

INVENTOR.
Boyd H. Smith.
BY
Fay, Oberlin & Fay
ATTORNEYS

Patented Nov. 3, 1931

1,830,569

UNITED STATES PATENT OFFICE

BOYD H. SMITH, OF SHELBY, OHIO, ASSIGNOR TO THE AUTOCALL COMPANY, OF SHELBY, OHIO, A CORPORATION OF OHIO

RECORDER

Application filed April 2, 1925. Serial No. 20,306.

This invention, as indicated, relates to a recorder. More particularly it comprises an electrically operated time stamp and punch register adapted to mark a record strip, thus producing a record of the code and time of operation of fire alarm boxes, watchman's signal boxes, or other transmitting devices. The apparatus also includes mechanism for indicating when the enclosing casing of the recorder has been opened, and also when the casing has been restored to closed position. It also includes a pair of lamps which indicate, respectively, when the apparatus is in operation and when the main power source is disconnected.

Devices of the general character herein indicated have been utilized for making records upon strips of paper or similar material, either by marking the same with a pen or stylus, printing the same with various characters, or punching the same with certain code markings, but such apparatus, when of the stylus type, requires careful adjustment and renewal of the marking elements, and when of the strip perforating type, requires stopping of the strip feeding mechanism, while the perforating mechanism is in operation.

The present invention has for an object the improvement of recording devices to the end that a permanent record may be supplied through the successive marking or perforation of a record strip while such strip is in motion. Another object of the invention is to include with a recording apparatus means for starting and stopping the strip feeding mechanism, and to combine therewith a strip-perforating mechanism, and a time stamp mechanism, each of which will operate while said strip is in motion. Another object of the invention is to provide for a uniform rate of motion of the record strip irrespective of the amount of material upon the supply and take-up reels, to provide a compensating drive for the take-up reel, and to incorporate an automatic control for the apparatus which will provide for the positioning of the last received code record upon a display panel. Another object of the invention is to provide a motor for actuating the strip feeding mechanism, which motor will rapidly accelerate to a predetermined speed of operation and will stop quickly when the current is cut off. A further object of the invention is to provide indicating means which will automatically record the fact of the opening of an enclosing casing and the closing thereof, as well as the time when such action took place. Another object of the invention is to co-ordinate the action of the code recording and time stamp mechanism. Other objects of the invention are to provide various improved features of mechanical structure whereby a recorder will operate more effectively and will be more readily maintained in proper adjustment under conditions of severe usage. Other and further objects will appear in the course of the following description. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 2:
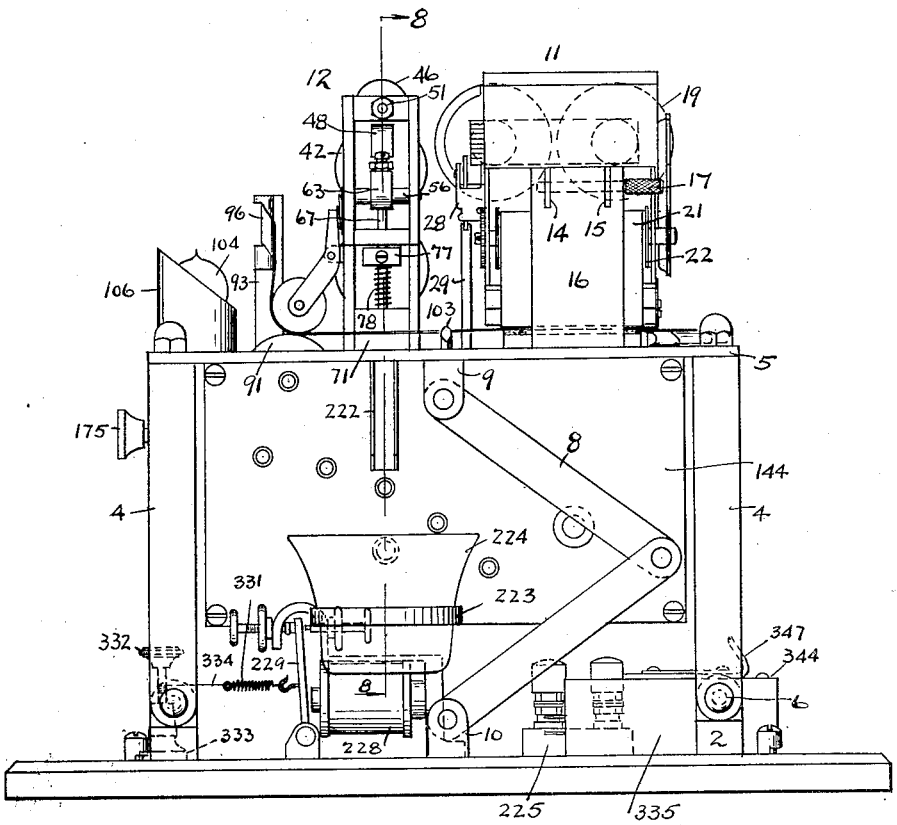
Figure 3:
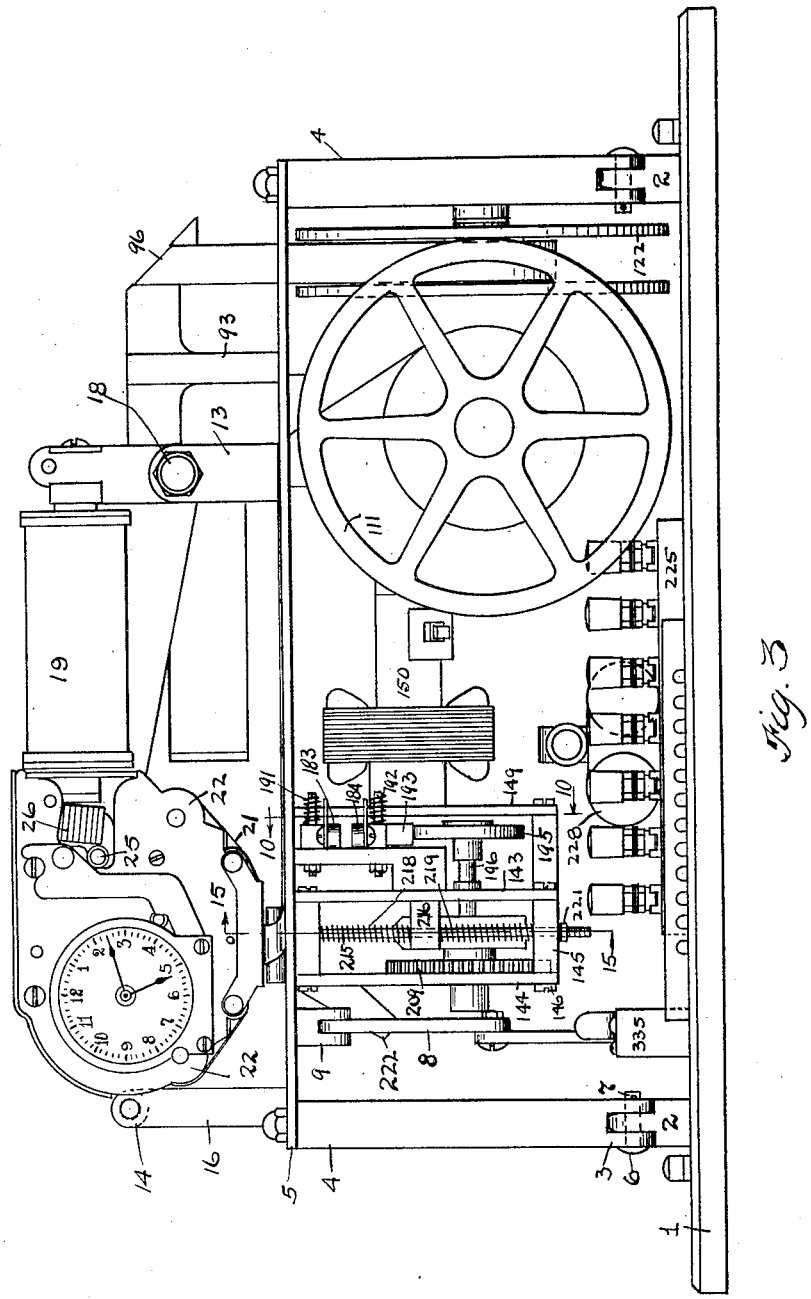
Figure 4:
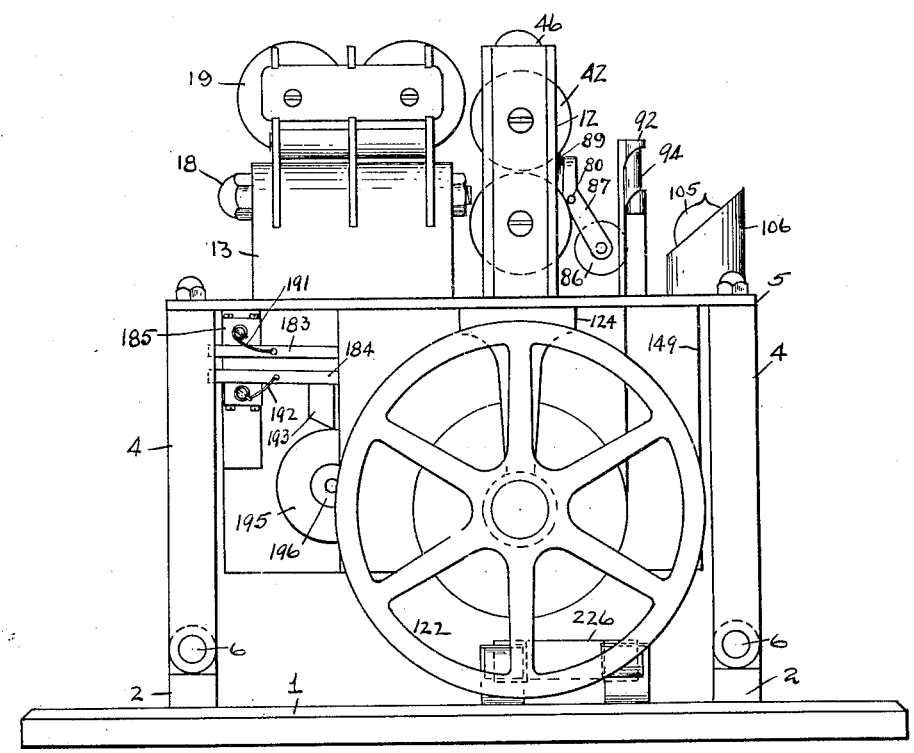
Figure 5:
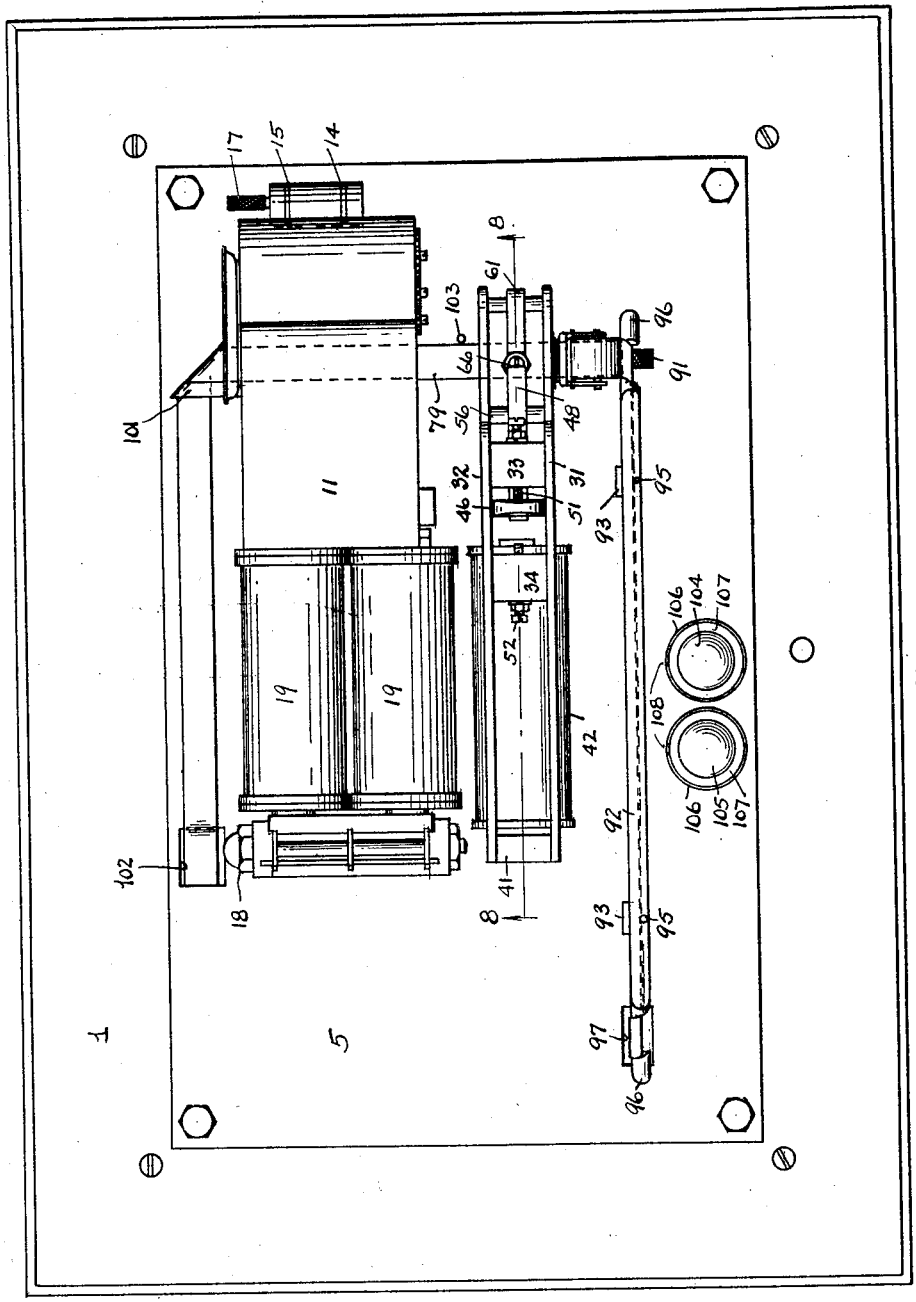
Figure 19:
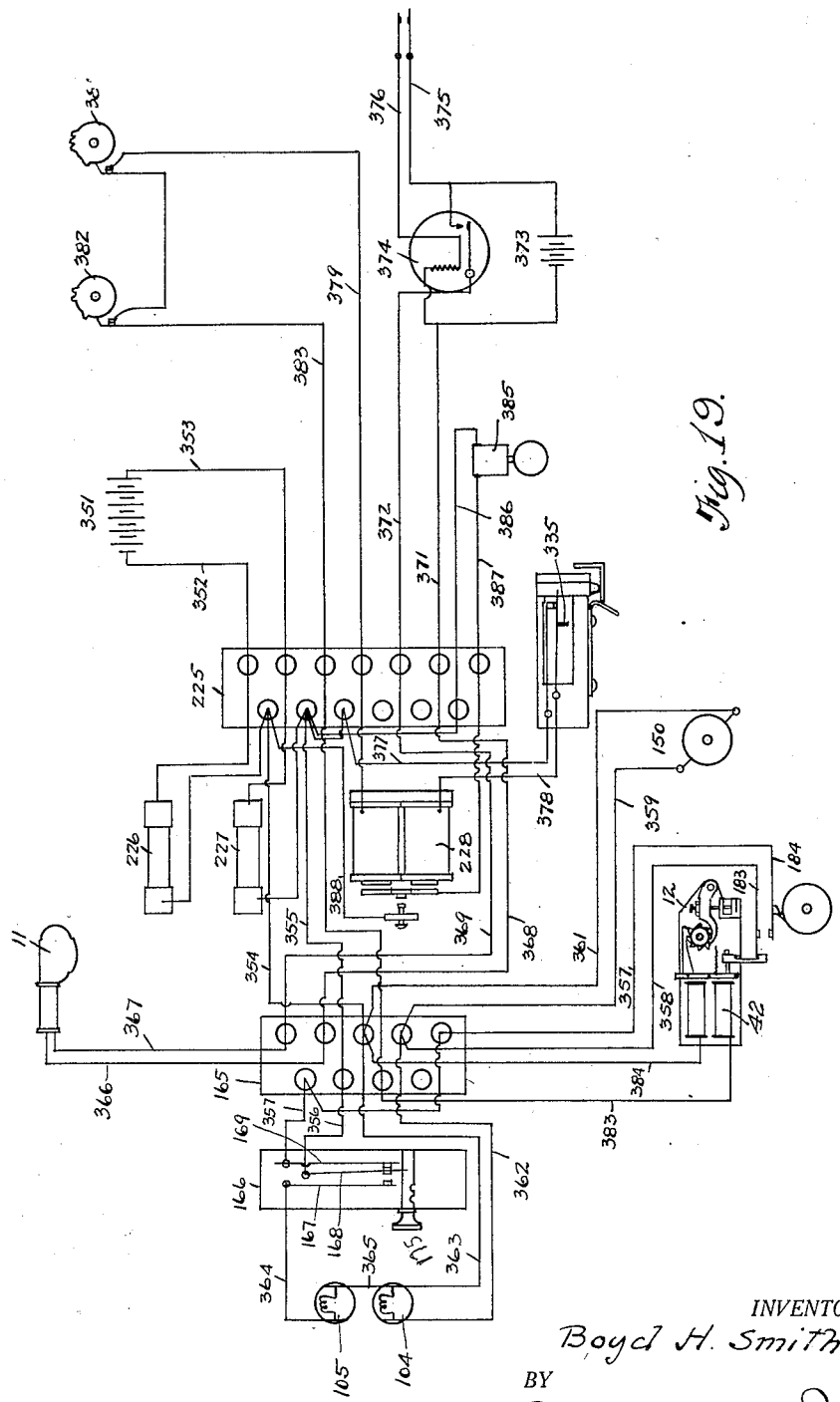

Fig. 1 is a front elevation of an apparatus embodying the principles of my invention; Fig. 2 is an end elevation of the apparatus shown in Fig. 1, as seen from the right-hand side; Fig. 3 is a rear elevation of the apparatus shown in Fig. 1; Fig. 4 is an end elevation of the apparatus shown in Fig. 1, as seen from the left-hand side; Fig. 5 is a top plan view of said improved apparatus; Fig. 6 is a top plan view of the base portion of said apparatus; Fig. 7 is a plan view of the under side of the top plate of said apparatus; Fig. 8 is a view, partially in section, taken along the line 8—8 shown in Fig. 2, looking in the direction of the arrows; Fig. 9 is a view, partially in section, taken along the line 9—9 shown in Fig. 8. looking in the direction of the arrows; Fig. 10 is a detail view, partially in section, taken along the line 10—10 shown in Fig. 3, looking in the direction of the arrows;

Fig. 11 is a vertical sectional view taken centrally through the tamper switch; Fig. 12 is a vertical sectional view taken centrally through the frictional clutch of the take-up reel; Fig. 13 is a view of the mechanism shown in Fig. 12, partially in section, with the reel and clutch rotated through an angle of 90 degrees from their position shown in Fig. 12; Fig. 14 is an enlarged detail end view, partially in section, taken along the line 14—14 shown in Fig. 13, looking in the direction of the arrows; Fig. 15 is an enlarged vertical sectional view of the time stamp printing mechanism taken along the line 15—15, shown in Fig. 3, looking in the direction of the arrows; Fig. 16 is a vertical sectional view taken along the line 16—16 shown in Fig. 15, looking in the direction of the arrows; Fig. 17 is a perspective view of the strip displaying bar as seen from the front; Fig. 18 is a horizontal sectional view taken centrally of the main switch; and Fig. 19 is a diagrammatic view showing the several circuits employed and their relation to the various operating elements.

As is clearly shown in the drawings, the apparatus comprises a base plate 1, preferably formed of bakelite or similar insulating material, and having spaced from its respective corners four supporting posts 2. Each of the supporting posts is preferably formed on its upper side to provide one member of a hinge 3, the companion member of each hinge being formed at the base of each of the corresponding standards 4, which are uniform in cross-section with said posts and support the top plate 5 of the apparatus. The parts last described are preferably formed of brass, although other suitable material may be employed.

The hinged connections between the posts and standards are formed by means of pins 6 engaged in suitable apertures provided transversely of the companion hinge sections and cotter pins 7 prevent the removal of said hinge pins. When all four pins are seated in position the top plate will be held firmly parallel to the base. When, however, the pins at either the forward or rearward portion of the base plate are removed, the top plate may be swung correspondingly forward or backward. The angular position of the top plate is limited by means of a hinged restraining arm 8, which is secured at one end to a block 9 attached to the under side of the top plate, and at its opposite end to a block 10 secured to the base plate.

The top plate supports on its upper side the time stamp head 11, and the record strip-perforating mechanism, which will be designated the punch unit 12, and upon its under side carries various operative parts which will be presently described. The main circuit terminals carried by the base plate are connected by means of flexible conductors with the parts carried by the top plate, and thus the tilting of the top plate in no way affects the continuous operation of the recording mechanism. The ends of the conductors are suitably anchored to their respective plates.

As has been stated, the time stamp head and punch unit are carried on the upper side of the top plate.

The time stamp mechanism

The time stamp head comprises a device of standard construction, the details of which form no part of the present invention. It is adapted to be hingedly supported upon a supporting block 13 rigidly attached to the upper face of the top plate. The opposite end of said time stamp head carries a pair of projecting ears 14 which are adapted to be received within slots 15 formed in a standard 16 secured to the opposite end of the top plate. The ears and standard are provided with registering apertures through which a locking pin 17 is adapted to be engaged. When said pin is withdrawn the time stamp head may be turned upwardly about its hinge pin 18. The time stamp includes the usual operating magnets 19, a ribbon 21, ribbon spools 22, and ribbon feeding gear train 23. It is also provided with a series of individual type wheels 24 adapted to be rotated by a pawl and ratchet mechanism 25, connected with a hinged armature 26. The magnets are connected with a master clock which may be adapted to rotate the proper type wheels at one minute intervals. The cables connecting with the master clock circuit are of sufficient length to permit the swinging of the time stamp unit to an upward position. When the time stamp is lowered so as to be supported upon the two spaced standards on the top plate, the lowermost characters on the type wheels will be brought closely adacent the upper face of the stamp hammer which projects through a transversely formed slot 27 in said top plate. Means for actuating the ribbon feeding gear train is mounted on the forward face of the time stamp head and comprises a pawl and ratchet mechanism 28 adapted to seat over the head of the time stamp ribbon shifting arm 29, which will be presently described.

The punch unit

The punch unit is supported longitudinally of the top plate parallel to and forwardly of the time stamp head, in a frame comprising a pair of side plates 31, 32, held in spaced relation to each other by spacing blocks including a pair of stop blocks 33, 34, disposed adjacent its upper right-hand portion. A magnet bar 41, preferably formed of soft steel or Swedish iron, is secured vertically between said plates at their left-hand side, and a pair of horizontally positioned magnet coils 42 having cores 43, preferably formed of soft steel or Swedish iron, are mounted in said frame with said cores in contact with said magnet bar and held firmly thereto by means of retaining screws 44. The sides of said respective plates are provided with aligned elongated apertures 45 to receive the projecting side portions of the magnet coils. An armature 46, preferably formed of soft steel or Swedish iron, is mounted upon a pivot pin 47 secured transversely of said punch unit frame adjacent the lower right-hand portion thereof and is apertured adjacent its upper end to receive the end of a hook-shaped pawl 48 which is adapted to be mounted upon a pivot pin 49 secured transversely of said opening. The extreme upper end of said armature projects slightly above the adjacent mechanism and provides for hand operation where desired. It is slightly beveled and is adapted to bear against abutment pins 51, 52, secured in the stop blocks 33, 34, heretofore referred to. Through the adjustment of said pins, which are screw-threadedly engaged in said stop blocks, the limits of motion of said armature may be accurately controlled. At an intermediate point said armature is provided with a screw 53 which serves to secure thereto an adjustable armature retracting spring 54 and a pawl operating spring 55.

The hook-shaped end of said pawl is adapted to extend horizontally toward the right-hand side of said punch unit above a ratchet wheel 57 mounted upon a horizontal spindle 56 and provided with a series of ratchet teeth 58 having flat contact faces 59. The under face 60 of the hook-shaped end of said pawl corresponds in size with said faces 59 of the ratchet teeth, and when said armature is drawn against the magnets the upper face of the pawl 48 will abut and lie parallel to the under face of the stop block 33 and the under face 60 of the pawl end will abut and lie parallel to the adjacent contact face 59 of the ratchet wheel. Thus the ratchet wheel cannot turn more than one tooth at each operation of the punch mechanism and overtravel of the ratchet wheel is prevented. The faces 59 of said ratchet teeth are also adapted to be engaged by the head of a punch latch 61 which is provided with a corresponding flat face 62 terminating in an angular shoulder 63 against which the radial face 64 of a ratchet tooth is adapted to bear, as is plainly shown in Fig. 8 of the drawings.

The punch latch is preferably formed of hardened steel, as are also the armature pawl and the ratchet wheel. Said punch latch is pivotally supported upon a transverse pin 65 secured at the right-hand side of the punch unit frame and projects toward the left-hand side parallel to the pawl 48 but in the opposite direction thereto and beneath the ratchet wheel. At an intermediate point said punch latch is provided with a vertical aperture within which is screw-threadedly engaged an adjustable contact pin 66 which bears against the upper end of the punch rod 67 which is preferably formed of drill rod steel having a tempered lower end. Said punch is adapted to co-act with a die 68, also preferably formed of drill rod steel suitably tempered, which is pressed into the punch block.

The punch block 69 is preferably formed of brass, and has integral lateral extensions 71, 72, adjacent its top and bottom. It is adapted to be received between the side plates of the punch unit immediately above the top plate at the right-hand side, and is suitably secured thereto with the projecting portions extending toward the right-hand end thereof. The lateral extensions of the punch block are provided with aligned vertical apertures 73, 74, of a size to slidingly receive the punch rod. The lower extension of said block is of approximately twice the thickness of the upper extension, and is provided with a horizontal slot 75 intersecting said punch rod passageway. The punch rod is notched at an intermediate point to form a seat for the set screw 76 for securing at such point a return spring block 77 which provides an abutment for a coiled spring 78 interposed between said block and the upper face of the lower extension of the punch block. Said spring holds the upper end of the punch rod against the end of the contact pin 66 and resiliently presses the free end of the punch latch against the teeth of the ratchet wheel.

Through the mechanism just described the perforation of the record strip 79 is brought about. Thus, when the electromagnets of the punch unit are energized they will attract the armature carrying the pawl 48, and the ratchet wheel 56 will be rotated one tooth. As the ratchet wheel rotates the flat face of the ratchet tooth in contact with the flat face 62 of the punch latch will force the punch latch downwardly and through its contact pin 66 bearing against the upper end of the punch bar will produce the punching action of the latter. The degree of motion of the punch bar will be adequate to perforate the record strip and force the punched out material or "punching" through the opening of the die. Immediately after effecting this operation the nose of the ratchet wheel tooth will ride past the radial shoulder 63 of the punch latch which will thereupon be forced upwardly by the action of the punch rod spring and its associated mechanism. Thus, an extremely rapid punching action and withdrawal of the punch will be produced each time the ratchet wheel is moved one tooth through the action of the armature and its pawl.

Immediately beneath the armature and projecting through an aperture in the top plate a motor switch latch 81, formed preferably of bakelite or some similar insulating material, is pivotally supported, with a latch engaging shoulder 82 provided at its lower end and adapted to be engaged with the upper motor switch arm hereinafter to be described. Said motor switch latch is pivoted upon a transverse pivot pin 83 mounted in the side plates of the punch unit frame and is pressed toward the armature by means of a return spring 84. An adjusting screw 85 is mounted in said motor switch latch transversely of its upper end in a position to bear against the lower outer face of the armature. The adjustment of the parts is such that when the armature plate is moved away from the electro-magnets the motor switch latch is thrown to disengaging position, and, when the armature plate is attracted toward the electro-magnets, the motor switch latch is resiliently held against the adjacent edge of the extension end of the upper motor switch arm, in position to engage beneath the latter as soon as it is elevated through mechanism presently to be described.

Upon the forward plate of the punch unit at one side adjacent the slotted punch block, a pressure roller 86, formed of bakelite, hard rubber or other suitable material, is carried in a yoke 87 engaged upon a pivot support 80 secured to said plate. The rearward portion of said yoke is of U-shape and is provided with a lateral tongue 88 which engages the terminal loop of a compression spring 89 which, in the form shown, is of volute shape and secured at one end to said forward plate. The roller is adapted to co-operate with a strip feeding wheel 91 which projects through a transverse slot formed through the top plate adjacent the punch guide block to frictionally engage the record strip.

The display panel

Parallel to the punch unit and spaced forwardly therefrom, a strip display plate or panel 92 is provided, being supported upon a pair of standards 93 having their lower ends suitably secured to said top plate. The forward portion of said display panel is provided with a longitudinal groove 94 to receive the record strip. A pair of guide pins 95 extend across said groove, preferably at spaced points adjacent said standards. The ends 96 of said display panel are rounded and are beveled upwardly. This affords means at the right-hand side of said panel for turning the upper face of the record strip outwardly at right angles as it is moved across said display panel in order to exhibit the code and time stamp markings. The beveled edge at the opposite end of said display panel serves to turn the record strip at right angles as it is fed downwardly to the take-up reel through an aperture 97 adjacent the opposite end of the top plate.

Record strip mechanism

A guide block 101 for the record strip, preferably of triangular shape, is mounted on the top plate adjacent the rearward end of the time stamp hammer. Said block is undercut adjacent one rearward corner to permit the record strip to be engaged beneath the same after it emerges through the aperture 102 in the top plate immediately behind the standard forming the time stamp hinge support and moves parallel to the rearward edge thereof. The adjacent angular edge of said block is provided with a rounded face which serves to turn the record strip at right angles to move transversely of the top plate and guide the same between the time stamp head and the time stamp hammer, behind the beveled guide pin 103 mounted on the top plate, through the slot of the punch block and between the roller and the strip feeding wheel. Said guide block serves not only to turn the course of the record strip at right angles, but also to reverse the face of the record strip as it passes below the time stamp ribbon. The time stamp impression, therefore, will be upon the upper side of the record strip which is turned outwardly as the strip is again turned at right angles to pass across the display panel.

Adjacent the forward edge of the top plate a pair of lamps are supported. One of said lamps 104 is adapted to illuminate the display panel as the record strip is being moved thereover and the other lamp 105 serves as an indicator for the main switch. The bulbs of said lamps are housed within removable tubular hoods 106 which are adapted to serve as reflectors and are angularly cut away upon their inner sides. The lower portions of said hoods engage over positioning rings 107 which are secured to the top plate around apertures therein which receive the lamp sockets. On their inner sides the hoods are notched to engage over projecting lugs 108 formed on said rings so that accurate positioning of the same may be readily maintained.

The record strip reels

The under side of the top plate, as has been indicated, serves as a support for the remaining portion of the record strip feeding mechanism as well as other operative parts. Immediately beneath the rearward aperture 102 through the top plate, the supply reel 111 for the record strip is supported, a right angled bracket 112 being provided at its lower end with a pin 113 projecting rearwardly and forming a stub shaft upon which the idler spool 114 carrying the record strip is adapted to be rotatably supported. The supply reel is provided on its inner side with a guard wheel 115 firmly engaged upon the stub shaft and upon its outer end is supplied with a detachable guard wheel 116 which carries upon its outer hub portion a knurled head 117. The guard wheel of the supply reel is made of identical size and shape with the guard wheel used upon the take-up reel and is readily interchangeable therewith. The details of said guard wheel construction are shown in Figs. 12, 13 and 14 of the drawings, wherein the projecting knurled head is provided with a circumferential groove 118, adjacent the outer face of the guard wheel, and a pair of slots 119 communicating therewith and with the axial recess in said hub. A retaining member 121, preferably formed of a light spring wire, is adapted to have its side portions seated within said slots, thus forming a snap fastener for engaging over the head of the stub axle which is appropriately grooved to receive the same. The outer portion of the stub shaft is beveled to permit the ready detachment of said guard wheel by grasping the knurled head and moving said guard wheel outwardly.

At right angles to the supply reel and adjacent the end portion of the frame the take-up reel 122 for the record strip is mounted. Said take-up reel is driven by a shaft 123 connected at its forward end with a gear train driven by the motor, as will be hereinafter described, and adjacent its rearward end is journaled in a right-angled bracket 124 similar to that supporting the stub shaft of the supply reel.

The main body portion of said drive shaft for the take-up reel may be tubular or provided with sockets at its respective ends. At its forward end (Fig. 8) it is sleeved over the end of the driving spindle 125 and secured thereto by means of a cotter pin 126, and at its rearward end (Fig. 12) has secured therein a short steel friction shaft 127 carrying a polished friction disc 128 in spaced relation to the journal 129. A pair of friction washers 131, preferably of molded bakelite or some similar material, are applied to opposite sides of the friction disc. A volute adjusting spring 132 is mounted on the inner side of the inner friction washer and is adapted to bear against the adjusting plate of the friction hub for the take-up reel. Said adjusting plate 133, shown in Fig. 12 of the drawings, is slidable upon the tubular portion of the shaft adjacent the journal. The hub 134 of the take-up reel comprises an enlarged inner portion 135 recessed to engage over the disc of the friction shaft and enclose its associated friction washers and adjusting spring.

The outer end of said hub is of reduced diameter and is of a size to receive the spool 136 of the record strip roll. The extreme outer end 137 of said hub is of still further reduced cross-section and is provided with a groove 138 similar to that of the stub shaft for the supply reel and is adapted to receive a guard wheel 115 identical with the outer guard wheel of the supply reel and interchangeable therewith, as heretofore explained. The inner guard wheel 139 of the take-up reel is seated against and securely fastened to the enlarged portion of the hub. A pair of outwardly projecting needle points 141 are provided upon said inner guard wheel in a position to engage and penetrate the adjacent side of the spool 136 of the record strip roll which customarily is formed of wood. The enlarged portion of the hub of the take-up reel is provided with a pair of diametrically opposite openings through which the adjusting screws 142 for the adjusting plate of the take-up reel are engaged. As will be obvious from what is disclosed in Fig. 12 of the drawings, the tightening of the adjusting screws will draw the adjusting plate 133 toward the hub of the take-up reel and will compress the volute spring against the inner bakelite washer and in this way will force the bakelite washers against the friction disc. Thus, by turning the adjusting screws, any desired degree of friction necessary to take up the slack in the record strip may be readily provided for.

The motor drive

Upon the under side of the top plate the lower movement parts and the motor drive are adapted to be secured. Centrally of the forward portion of the top plate the main switch and terminal block for the various circuit connections are secured, as will be presently described. The movement frame comprises a pair of plates 143, 144, held spaced apart by corner posts 145 and retaining screws 146 and provided at suitable points with bushings serving as journals for the various gear shafts of the clock train and driving mechanism. The movement frame is positioned transversely of the under side of the top plate adjacent the right hand end thereof, and its inner plate has secured thereto and held in spaced relation therefrom by means of a series of posts 147 and retaining screws 148 the supporting plate 149 for the motor mechanism.

The motor 150 is provided with the usual frame 151 supporting the field coils 152 and one end thereof is securely attached to the motor supporting plate. The armature shaft 153 projects through the inner plate of the movement frame and carries a drive pinion 154 which actuates the clock train in a manner which will presently be described.

The motor is of conventional design but the outer end of the armature shaft at the commutator side carries a friction governor particularly adapted to hold the rapidly accelerating motor to a predetermined operating speed. Said governor comprises a pair of parallel cross bars 155 secured to the outer end of the armature shaft by means of a transverse pin, and carrying at their outer ends, respectively, a pair of weighted bell-crank arms 156 for cam action against a pair of apertured discs 157, 158, mounted on said armature shaft on either side of said transverse arms. The inner of said discs 157 is of larger diameter than the other disc 158 and is adapted to bear against a disc of friction material 159 secured to a cylindrical boss 161 formed on the outer end of the motor frame. A volute coil spring 162 is interposed between the outer disc and an adjustable nut 163 on the extreme end of the armature shaft and is adapted to apply a predetermined degree of pressure against said disc. The outer disc is of a diameter to fit within the angles of the bell-crank arms when the same are in their fully retracted position. As the motor revolves and centrifugal force is developed the projecting ends of the bell-crank arms act as governor weights and move outwardly, their inner ends and intermediate portions serving to press against and separate the adjacent discs. Thus, the degree of tension applied to the inner disc will depend upon the degree of resilience in the spring bearing upon the outer disc against which the cam arms fulcrum in pressing the inner disc against the stationary friction disc on the motor frame. The action of the governor is such that the rapid acceleration of the motor is not interfered with but the motor is maintained at a substantially constant speed after it has accelerated to a predetermined degree. The governor mechanism also prevents "coasting" of the motor after the current is shut off, and thus releasing the time stamp hammer at the end of the cycle rather than at the beginning, as will be hereinafter described. It is desirable to have the material employed for the friction disc of such quality that practically no replacement will be necessary during the life of the apparatus.

The motor control

The motor preferably comprises a series wound type of apparatus and is connected with the terminal block 165 adjacent the main switch 166 upon the under side of the top plate. The main switch 166, as is clearly shown in Figs. 7 and 18 of the drawings, comprises a bakelite block carrying three parallel spring contact arms 167, 168, 169, projecting into a recess 171 formed centrally of said block. The central arm 168 is of somewhat greater length than the outer arms 167, 169, and is adapted to be engaged in a notch 172 formed in the switch shaft 173 slidingly engaged within a passageway 174 formed through said block and intersecting said recess. The switch shaft carries an operating knob 175 on its outer end and a pair of notches 176 are formed upon the side thereof opposite the notch 172 first mentioned which are adapted to be engaged by a spring-pressed detent 177 housed within a recess 178 at right angles to said switch shaft. The elongated central contact arm is provided with contact points 179 on either side adjacent the free end thereof which are adapted to contact respectively with contact points 181, 182, on the inner sides of the adjacent spring arms 167, 169. The arrangement of the parts is such that the contacts on the central arm will at all times be in contact with at least one of the contact points upon either of the adjacent contact arms. Thus there will be no possibility of the main switch being open without the circuit through the trouble lamp being closed.

The motor circuit is completed through a pair of switch arms 183, 184, which are housed within the space between the motor supporting plate and the inner plate of the movement frame. Said switch arms, as is shown more particularly in Fig. 10, extend inwardly over the armature shaft, being pivoted adjacent the rearward end of said top plate upon studs 185, 186, supported upon an insulating block 187 and carrying a pair of contact points 188, 189, adjacent their forward ends. A pair of coil springs 191, 192, mounted upon the outer portions of the supporting studs, serve to press the respective switch arms downwardly. The lower switch arm 184 is provided with a depending lug 193 having a beveled under side which is adapted to be engaged by means of a cam block 194 having a co-acting beveled face and carried upon a disc of insulating material 195 which is mounted upon the stamp hammer retracting shaft 196. The cam block has the further function of contacting with the end of the time stamp ribbon shifting bar 197, as will be hereinafter described.

The upper switch arm projects forwardly of the contact points to a position adjacent the motor switch latch 81, heretofore described, and is raised through the co-operation of said cam block 194 with said depending lug 193 in the coures of the rotation of the disc 195. When the supervising current is in operation to hold the armature against the magnets of the punch mechanism the shoulder 82 on the motor switch latch will engage the forward extension of the upper switch arm. When, however, said armature is released and falls forward through the action of its spring and gravity, it will strike the adjusting screw 85, and the engagement of the shoulder of the motor switch latch with the upper switch arm will be interrupted. The motor will be set in operation through the switch points 188 and 189 being brought together.

The ribbon shifting bar 197 is preferably formed of polished steel, bent at right angles at an intermediate point and pivotally engaged between a pair of bearing blocks 198 mounted on the under side of the top plate. The cam block 194 upon the insulated disc, in addition to having a beveled end face, is beveled upon one side, and the lower end of the ribbon shifting arm is turned at an angle and provided with a beveled end face to co-operate with the beveled face of said cam block. The upper end of the ribbon shifting bar terminates in a head 29 which co-acts with a pawl and ratchet mechanism in the time stamp head, as heretofore described. Thus, upon each revolution of the insulated disc the ribbon feed arm will be shifted an adequate distance to actuate the ribbon feed movement carried by the time stamp head.

The lower drive movement

The lower drive movement comprises the main drive pinion 154, on the motor shaft 153, as heretofore described, which engages a drive gear 201, preferably formed of formica, or other non-metallic material, which, through its pinion 202 and a train of reducing gears and pinions 203, 204, 205, actuates the record strip feed wheel 91 through its pinion 206. A second gear 207, carried by the spindle 125 forming part of the drive for the take-up pulley, is driven through engagement with the pinion of the gear 203, which forms a part of the drive for the record strip feed wheel, as just described. The pinion 202 also drives through a reducing gear and pinion 208, a large gear 209 carried by the time stamp hammer cam shaft 196. Said shaft, as heretofore indicated, projects through the inner plate of the lower movement frame and carries at its inner end an insulated disc 195 having a peripheral cam which actuates the motor switch and the ribbon feed arm. At a central position within the lower movement frame the time stamp hammer cam 209' is mounted on said shaft, as is clearly shown in Figs. 15 and 16. The time stamp hammer 211 preferably comprises a T-shaped bar having a bifurcated lower portion. At an intermediate point aligned elongated vertical slots 212 are formed through the arms of the bifurcated portion of said hammer and said cam shaft is adapted to be received within said slots, with the cam 209' positioned between said bifurcated arms. A cam block 213, preferably formed of tool steel, is secured by means of suitable fastening elements at the bottom of said bifurcated portion of the time stamp hammer.

The upper side of the T-head of the time stamp is grooved to receive the felt covered hammer block 214 which is adapted to contact with the under side of the record strip when said hammer is released. A pair of guide rods 215 are secured at opposite sides to the under face of the T-head of the time stamp hammer and extend downwardly to a point below the open under side of the lower movement frame. Said guide rods are adapted to be slightly received in openings formed through projecting lugs 216 upon the time stamp hammer guide block 217, the intermediate portion of which is cut away so as to provide for the free movement of the body portion of the time stamp hammer. Said guide block is firmly secured by suitable means to the inner face of the inner plate of the lower movement casing. Above the apertured lugs of said guide block, actuating springs 218 for the time stamp hammer are engaged upon the guide rods, and below said lugs the recoil springs 219 for the time stamp hammer are secured. The lower ends of the guide rods are screwed-threaded and nuts 221 adjustable thereon serve as abutments for the lower ends of said recoil springs and are adapted to vary the tension thereof to the desired extent.

It will be obvious from the mechanism just described that as the time stamp hammer cam is revolved counter clockwise it will bear against the cam block and move the time stamp hammer downwardly against the pressure of the hammer actuating springs. The nose of the cam is so positioned with respect to the cycle of the motor that the hammer will be held in retracted position as the motor reaches the end of its cycle of movement and will be moved off the cam block immediately after the motor has started on its succeeding cycle and the punch mechanism has been actuated to form the first mark of a code record. At such time the nose of the cam will rotate off the cam block and the hammer will be released to move sharply upward, striking the under side of the record strip and pressing the same with the overlying ribbon section against the lower type faces of the time stamp. The momentum of the time stamp hammer is sufficient to slightly compress the recoil springs carried on the lower portions of the guide rods and the hammer will thus strike a blow against the under face of the record strip and will return to spaced position beneath the same immediately thereafter, being held retracted to said position by the counter-balancing effect of the recoil springs.

The outer plate of the lower movement frame is slotted adjacent its upper edge and the punching chute 222, preferably of light sheet metal, is secured therein immediately beneath the punch guide block. A supporting ring 223 for the punching receiver glass 224 is secured adjacent the lower edge of the outer plate of the lower movement frame, immediately beneath said chute. Thus, as the punching mechanism is actuated the punchings will be fed into the glass receiver and said receiver may be removed and the punchings disposed of from time to time.

The base plate

Upon the upper face of the base plate the main terminal block 225 is secured. Said block carries the circuit terminals for all of the circuits connected with said apparatus through the entrance block 220 and the cable connections extend from said block to the terminal block upon the under face of the top plate. Said terminal circuit connections are preferably bound together with clips and bands and are of sufficient length to permit the tilting of the top plate upon its supporting standards in either direction, as heretofore described, so that inspection may be made of the apparatus carried on its under side, without interrupting the operation of the recording mechanism. At a central point upon the base plate a pair of fuses 226, 227, are mounted in suitable clips, said fuses forming part of the main power circuits. A relay 228 is mounted adjacent said fuses on said base plate and the armature 229 of said relay is tensioned to the desired extent by adjusting the tension upon its retracting spring 331 by means of an adjustable post 332 frictionally engaged in a split socket 333 and connected with a flexible member 334 secured to the free end of the armature spring.

The tamper switch

Adjacent the terminal block upon the base plate a tamper switch 335 is provided. Said tamper switch comprises a block 336 of insulating material, such as bakelite, provided with a recess 337 at one side within which a pair of contact springs 338, 339, are housed. Said springs carry contact points 341, 342, adjacent their free ends. The upper of said contact springs is somewhat longer than the lower spring and is engaged within a notch 343 formed transversely of a plunger rod 344 reciprocably engaged within a vertical opening 345 at the rearward end of the tamper switch block and intersecting the recess 337. The upper end of said plunger rod is rounded and is adapted to project slightly above the upper face of the tamper switch block when said tamper switch contacts are open. When the cover (not shown) for the apparatus is in place, an operating bracket for said tamper switch is adapted to rest against the upper end of said plunger rod and hold the same depressed with the tamper switch contacts closed. Thus, when said cover is removed the tamper switch contacts will be opened and the breaking of a circuit will serve to produce a single punch mark upon the record strip and will release the time-stamp hammer so as to indicate the time and date of such removal of the cover.

In order to permit the operation of the mechanism in its normal manner, after the removal of the cover, or to make tests of the apparatus when the cover is removed, a sliding key 346, preferably formed of brass, is mounted upon the upper face of the tamper switch block. Said key has an upwardly turned rearward end 347 and is secured to said block by means of a pair of screws 348 extending through a pair of elongated slots. Said key is adapted to be moved rearwardly over the end of the actuating rod for the tamper switch so as to hold the same depressed after the cover is removed and thus permit the operation of the recording apparatus. When said key is moved forwardly the tamper switch will be opened. In order to prevent interference by said sliding key with the making of a record upon the replacement of the cover when said key is in its rearward position, the upturned end of said key is bent backwardly upon itself somewhat past a right-angled position, thereby providing an inclined face adjacent its rearward end which is adapted to co-act with the projecting edge of the tamper switch operating bracket which is secured to the inner frame of the cover. Thus, at any time when the cover is replaced the tamper switch bracket will move the sliding key away from the head of the plunger rod and will momentarily open the contacts to make a record before said bracket bears directly against said rod with its lower face when the cover is moved to its final position of adjustment on the base plate.

Electrical circuits

The various electrical circuits employed in the apparatus are clearly shown in Fig. 19 of the drawings. The power source indicated as a battery 351, is connected by means of conductors 352, 353, with the main terminal block 225 on the base board, and thence through the fuses 226, 227, conductors 354, 355, to terminals on the terminal block 165 on the under side of the top plate, thence, when the main switch is closed, through conductor 356, switch arms 168, 169, and conductor 357, arms 183, 184, and conductors 358, 359, to the motor 150. The return circuit from the motor is through the conductor 361 to the upper terminal block 165, and through the conductor 354, to the current source as before mentioned. The display panel lamp 104 is connected in parallel with the motor through conductors 362, 363. The trouble lamp 105 is connected with the other arm 167 of the main switch through the conductor 364, and the return circuit is through the conductors 365 and 363, to the upper terminal block 165, and conductor 354, to the current source, as before mentioned.

The time stamp head 11 is connected by means of a pair of conductors 366, 367, to the upper terminal block 165, and thence through conductors 368, 369, to the main terminal block 225 on the base plate, and thence through conductors 371, 372, to a local battery 373, through a relay 374 connected with the master clock control through conductors 375, 376.

The terminals of the main power source on the terminal block on the base plate are also connected by means of conductor 377 through the tamper switch 335, conductor 378, relay coils 228, conductor 379, code wheel contacts 381, 382, and conductor 383, to the magnet coils 42 of the punch unit 12, the return circuit being through the conductor 384 to the upper terminal block 165, and conductor 354, to the current source as described. Through the relay 228 an external signaling device 385 is connected with the terminals on the main terminal block by means of the conductors 386, 387 and 388.

The operation of the device

The operation of the individual parts has been indicated in connection with the description of their construction. The general operation of the apparatus, however, will now be outlined. After establishing the proper electrical connections, the record strip is threaded from the supply reel 111 through the opening 102, over the top plate 5, around the guide block 101, beneath the time stamp head 11, inside of the beveled guide pin 103, and through the slotted punch block 69, thence between the feed wheel 91 and feed roller 86 and across the display panel 92 and downwardly through the opening 97 in the top plate to the take-up reel 122. The main switch 166 is then moved inwardly and with the armature 46 of the punching unit attracted to the electro-magnets 42, the apparatus is in operative condition to record signals transmitted through the code wheels.

As the code wheels 381, 382, are actuated to open and close the contacts adjacent the same through the engagement of the teeth on the peripheries thereof with the contact arms associated therewith, the current to the punch unit is interrupted, and the electromagnets of the punch unit are deenergized and permit the armature 46 to fall forward through the action of gravity and the armature retracting spring 54. As the armature falls forward it will move the latch 81 of the motor switch to releasing position, thereby connecting the motor circuit through the switch contacts 188, 189. The motor 150 will thereupon be energized and will rapidly accelerate to its normal operating speed. As the motor operates, all of its associated mechanism will be set in motion, including the record strip feed wheel 91, the take-up reel 122 for the record strip, the time stamp hammer retracting cam 209', the rotary motor switch setting mechanism 194, 195, and the ribbon shifting device 197. The motor continues to operate until the motor switch setting mechanism has completed one revolution, whereupon the current will be interrupted through the separation of said switch contacts 188, 189, when the motor will come rapidly to a stop, by virtue of the braking action of the governor. Such action, however, will take place only when the armature 46 has been re-attracted to the magnets of the punch unit, and upon the failure of such connection to be re-established, the motor will continue to operate until the main switch is opened.

As the record strip feed wheel 91 is actuated the strip will be fed through the apparatus at a uniform rate. When the pawl 48 carried by the armature of the punch unit moves forward it drops over the succeeding tooth of the ratchet wheel 57 at the end of its outward travel. As the tooth of the code wheel clears the contact arm the circuit through the electromagnets of the punch units is re-established, and, as the armature 46 is re-attracted, the pawl rotates the ratchet wheel and causes the ratchet tooth diametrically opposite the same to depress the punch actuating lever 61 and at the same time compress the punch return spring 78. Near the end of its downward travel the punch perforates the record strip and moves the punched out material or punching into the chute 222 and punching receiver 224.

As the armature 46 and pawl 48 return to their original position, the tooth of the ratchet wheel bearing against the punch actuating lever will have cleared the end thereof and permit said lever to be moved rapidly upward by the punch return spring. The ratchet wheel is prevented from over-travel by the pawl 48 coming against the underside of the block 33 coinciding with the face 59 of the ratchet wheel tooth. Thus, one complete punching cycle will have been carried through and the apparatus is ready to repeat the action as soon as the circuit is further interrupted at either of the code wheels.

The punching mechanism operates with great speed, the punch passing through the tape and out again during the latter part of the upward travel of the armature, and the record strip is fed at comparatively slow speed and therefore no interruption of the feeding of the record strip is necessary in order to secure accurately punched code records therein.

Shortly after the time stamp hammer cam shaft 196 has been actuated through the starting of the motor, the end of the cam 209' will ride off the adjacent edge of the cam block 213 and release the hammer 211 so that it may strike the under side of the record strip 79 and force the same against the ribbon 21 and the type wheels 24 of the time stamp head 11. The force of the hammer actuating springs 218 will be counteracted by the effect of the recoil springs 219 and the hammer will thus strike a sharp blow against the under side of the record strip and return to a position spaced from said strip through the action of such recoil springs and will not thereafter interrupt the free feeding of the record strip through the apparatus. The blow struck by the time stamp hammer is a very rapid one which does not in any way interfere with the movement of the record strip and produces a sharp imprint of the time stamp type upon the upper face of the record strip.

As the cam shaft of the time stamp hammer continues to revolve, the cam 209' will again engage the cam block 213 and retract the time stamp hammer 211, compressing the actuating springs 218 associated therewith.

During the operation of the motor the display panel lamp 104 will be energized, inasmuch as it is connected in parallel with the motor 150. The record strip, after receiving the punch marks of the code and the time stamp imprint will be moved upon the display panel and may be readily examined thereon. The operation of the motor is so related to the strip feeding mechanism that when the motor has completed a single cycle the code record upon the display panel will be in an approximately central position thereon. Thus the last received code record may be examined at any time prior to the operation of the apparatus in recording a succeeding unit record. Before the motor ceases operation upon its first cycle the cam 194 carried upon the motor switch operating disc 195 contacts with the ribbon shifting lever 197 and moves the ribbon of the time stamp head to the predetermined extent. Said cam 194 then engages the motor switch arms, 183, 184, through the lug 193, and moves the same upwardly until the upper arm 183 of said switch is engaged with the latch 81, and, after riding past the lug 193 on the lower arm 184 of the motor switch, permits the separation of the contact points of the motor switch and thus interrupts the motor circuit causing the motor to come rapidly to a stop.

As the individual teeth of the code wheels 381, 382, interrupt the circuit to the punch unit 12, the relay 228 will be actuated to close the circuit to the external signal 385. Such external signal may comprise a bell, as is shown in Fig. 19, or any other desired indicating device. When the main switch is opened the trouble lamp 105, preferably a red bulb, is energized and it will be at once apparent that the recording device is not connected for operation. In the event of the failure of the supervising current from the main power source, the armature 46 will fall forward from the punch unit magnets, closing the motor switch, and thereafter the record strid will be fed through the apparatus and the time stamp will be placed upon each predetermined code length of record strip until the main switch is opened or the current to the motor is disconnected. When the supervising current is resumed one punch is made in the record strip and the time is stamped thereon.

The tamper switch 335 is adapted to cooperate with a bracket (not shown) upon the cover for the apparatus and the removal of the cover serves to open the circuit to the punch unit, starting the motor and causing a time stamp imprint to be made upon the record strip. When the cover is replaced a single perforation is made in the record strip.

If, when the cover is removed, the sliding key 346 upon the tamper switch is moved forwardly, a single punch will be made in the record strip. When the cover is restored to position the bracket thereon will shift the tamper switch key to its original position, separating the switch contact points for an instant only, as hereinbefore explained, to make a single perforation in the record strip.

The impulses transmitted through the external signal circuit through the relay are duplicates of the code signals transmitted to the punch unit and therefore the external signal may be used to reproduce the code record at any desired point.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. An apparatus of the character described, having in combination a record strip, a strip feeding mechanism, means for actuating the same, strip marking mechanism and means for starting said strip and strip marking mechanism in motion, and for additionally marking said strip while in motion.

2. An apparatus of the character described, having in combination a record strip, a strip feeding mechanism, a punch for perforating said strip, a lever for actuating said punch, a ratchet wheel adapted to trip said lever, and means for restoring said parts to normal position.

3. In an apparatus of the character described, having a record strip, and a strip feeding mechanism, the combination of a punch for perforating said strip, a lever for actuating said punch, a ratchet wheel engaging said lever and adapted to trip the same, and means for actuating said ratchet wheel.

4. An apparatus of the character described, having in combination a record strip, a strip feeding mechanism, a motor for driving said mechanism, an electric circuit for transmitting predetermined signals to said mechanism, means associated with said circuit for energizing said motor, and means for interrupting the action of said motor after a predetermined interval.

5. An apparatus of the character described, having in combination a record strip, a strip feeding mechanism, a motor for driving said mechanism, a strip marking mechanism, an electric circuit, means associated with said circuit for transmitting predetermined signals to said strip marking mechanism, and means associated with said circuit for energizing said motor upon the transmission of said signals.

6. An apparatus of the character described, having in combination a record strip, a strip feeding mechanism, a motor for driving said mechanism, a strip marking mechanism, an electric circuit, means associated with said circuit for transmitting predetermined signals to said strip marking mechanism, means associated with said circuit for energizing said motor upon the transmission of said signals, and means for interrupting the action of said motor after a predetermined interval.

7. An apparatus of the character described, having in combination a record strip, a strip feeding mechanism, a motor for driving said mechanism, mechanism for marking said strip while in motion, an electric circuit, means associated with said circuit for transmitting predetermined signals to said mechanism, means associated with said circuit for energizing said motor, a time stamp associated with said strip marking mechanism, means associated with said motor for setting said time stamp mechanism, and means associated with said signal transmitting mechanism for releasing said time stamp mechanism.

8. An apparatus of the character described, having in combination a record strip, a strip feeding mechanism, a motor for driving said mechanism, mechanism for marking said strip while in motion, an electric circuit, means associated with said circuit for transmitting predetermined signals to said mechanism, means associated with said circuit for energizing said motor, a time stamp associated with said strip marking mechanism, means associated with said motor for setting said time stamp mechanism, means associated with said signal transmitting mechanism for releasing said time stamp mechanism, and means for interrupting the action of said motor after a predetermined interval.

9. An apparatus of the character described, having in combination, a time stamp head, a time stamp hammer disposed adjacent said head, an abutment disposed adjacent said head, a stem projecting from said hammer and passing through said abutment, said stem being formed with a slot, a pair of rods secured to said hammer and extending therefrom parallel to said stem, said rods being slidably received in apertures in said abutment, a shaft passing through said slot, a shoulder in said slot, a cam carried by said shaft in said slot and cooperable with said shoulder, a coiled spring sleeved on each of said rods between said hammer and said abutment, a stop on the free end of each of said rods, a coiled spring sleeved on each of said rods between said abutment and said stop, and means for rotating said shaft.

10. An apparatus of the character described, having in combination a time stamp head, a time stamp hammer positioned adjacent said head and having a slotted stem depending therefrom, a shoulder formed in the slot of said stem, a shaft extending through said slot and carrying a cam in said slot, said cam being adapted to cooperate with said shoulder to move said hammer away from said head, resilient means resisting such movement, means for rotating said shaft, and a recoil spring urging said hammer away from contact with said head.

11. An apparatus of the character described, having in combination a record strip, means for marking said record strip while in motion, a motor, means operatively associated with said motor for moving said record strip uniformly beneath said marking means, means associated with said marking means for actuating said motor, and means for interrupting the operation of said motor after a predetermined range of action.

12. An apparatus of the character described, having in combination a record strip, means for marking said record strip while in motion, a motor, means operatively associated with said motor for moving said record strip uniformly beneath said marking means, means associated with said marking means for actuating said motor, means for interrupting the operation of said motor after a predetermined range of action, and means associated with said motor for setting said marking means in position for automatic operation.

13. An apparatus of the character described, having in combination a record strip, a strip feeding mechanism, an electric motor for actuating said feeding mechanism, means for marking said record strip, means associated with said marking means for starting said motor, and means for opening said motor circuit.

14. An apparatus of the character described, having in combination a record strip, a strip feeding mechanism, an electric motor for actuating said feeding mechanism, means for marking said record strip, means associated with said marking means for starting said motor, and means driven by said motor for opening said motor circuit.

15. An apparatus of the character described, having in combination a record strip, a strip feeding mechanism, an electric motor for actuating said feeding mechanism, electro-magnetic means for marking said record strip and for starting said motor, and means driven by said motor for opening said motor circuit.

16. In a recording device, a base plate and a top plate supported thereon, said top plate having recording mechanism supported thereupon and depending therefrom, connections extending from the mechanism carried by said top plate to said base plate, the support for said top plate consisting of corner posts formed of upper and lower sections, pivot pins connecting said sections, said pins being removable from the front or rear to permit said top plate to be tilted rearwardly or forwardly, said connections between said base plate and mechanism carried by said top plate allowing the operation of said mechanism irrespective of the position of said top plate.

Signed by me, this 6th day of March, 1925.

BOYD H. SMITH.